United States Patent [19]

Rabilloud et al.

[11] Patent Number: 4,720,539

[45] Date of Patent: Jan. 19, 1988

[54] POLYIMIDE PRECURSOR COMPOSITIONS, THEIR MANUFACTURE, THE RESULTANT POLYIMIDES AND THEIR USE, PARTICULARLY FOR MANUFACTURING ENAMELLING VARNISHES FOR ELECTRIC WIRES

[75] Inventors: Guy Rabilloud, Grenoble; Paul Marriagi, Seyssuel; Serge Gonzales, Saint Priest; Bernard Sillion, Lyons, all of France

[73] Assignee: Centre d'Etudes des Materiaux Organiques pour Technologies Avancees, Vernaison, France

[21] Appl. No.: 920,824

[22] Filed: Sep. 10, 1986

Related U.S. Application Data

[63] Continuation of Ser. No. 758,948, Jul. 25, 1985, abandoned.

[30] Foreign Application Priority Data

Jul. 25, 1984 [FR] France .............................. 84 11842

[51] Int. Cl.$^4$ ............................................. C08G 69/26
[52] U.S. Cl. ..................................... 528/353; 560/37; 560/41; 560/76
[58] Field of Search ................... 528/353; 560/37, 41, 560/76

[56] References Cited

U.S. PATENT DOCUMENTS

| | | | |
|---|---|---|---|
| 4,225,702 | 9/1980 | Makino et al. ....................... | 528/353 |
| 4,389,510 | 6/1983 | McGregor et al. ............. | 528/353 X |
| 4,467,000 | 8/1984 | Economy et al. .............. | 528/353 X |
| 4,524,171 | 6/1985 | Bakshi et al. .................... | 528/353 X |
| 4,661,582 | 4/1987 | McCready ........................... | 528/292 |

FOREIGN PATENT DOCUMENTS

| | | |
|---|---|---|
| 1422458 | 3/1966 | France . |
| 1,565,555 | 4/1966 | France . |
| 2000824 | 12/1969 | France . |
| 2,269,557 | 2/1970 | France . |

*Primary Examiner*—Lucille M. Phynes
*Attorney, Agent, or Firm*—Millen & White

[57] ABSTRACT

Polyimide precursor compositions are described which may be prepared by reacting a biprimary aromatic diamine with a diester-diacid or an aromatic tetraacid, and then with the substantially stoichiometrical complement of an aromatic dianhydride.

The polyimide precursor compositions are used in the manufacture of insulating coatings, films, impregnating or enamelling varnishes for electric wires etc., and have excellent qualities of flexibility, adhesiveness and heat resistance.

29 Claims, No Drawings

POLYIMIDE PRECURSOR COMPOSITIONS, THEIR MANUFACTURE, THE RESULTANT POLYIMIDES AND THEIR USE, PARTICULARLY FOR MANUFACTURING ENAMELLING VARNISHES FOR ELECTRIC WIRES

This application is a continuation of application Ser. No. 758,948 filed July 25, 1985 abandoned.

This invention concerns new resin compositions of thermostable polyimide precursors, which can be used for manufacturing insulating coatings and films and for enamelling electric or magnetic wires. It concerns more particularly compositions of telechelic α,ω-diamino polyamide-acids, stoichiometrically associated with a reactant having a delay effect, which acts at the moment of use to give polyimides of high molecular weight.

It also concerns the use of said compositions as insulating coatings for protecting metals such as iron, steel, aluminum, copper, brass, nickel-plated copper, various metal alloys, silicium, germanium, titanium. It also concerns more particularly the use of said compositions for enamelling wires and impregnating enamelled wire coilings.

BACKGROUND OF THE INVENTION

Aromatic polyimides are known to exhibit exceptional mechanical and thermal properties in continuous use above 200° C. These polymers have been considerably developed as insulating films or varnishes of remarkable thermal stability (at least 1 000 hours at 250° C.), good flexibility and very good resistance to thermal shock and whose thermo plasticity temperature generally ranges from 400° to 500° C.

Most of the aromatic polyimides are also known as being insoluble and their use infusible and requires techniques which either need a non cyclized soluble polyamide-acid intermediary or a mixture of fusible reacting monomers which, by thermal treatment, may give a polymeric material.

According to a first technique, the polyimide is prepared in two successive steps. During the first step, a reaction between an aromatic diamine and a dianhydride of tetracarboxylic acid in an aprotic polar solvent gives a solution of polyamide-acid of high molecular weight. As the properties of the final polyimide (flexibility, thermoplasticity and thermal stability) are proportional to the molecular weight, it is imperative to use very pure solvents and reactants. Moreover, the amounts must be used in stoichiometrical proportions. The polyamide-acids of high molecular weight however give very viscous solutions, thus limiting the concentration of dry material to values ranging from 10 to 15% by weight. In spite of this low concentration, the dynamic viscosity of the solutions easily reaches 20 000 to 50 000 mPa.s.

For use as protective layer, where the thickness of the polyimide coating is a few microns, a low polymer concentration is not redhibitory, but when a deposit of several tens of microns must be obtained it is necessary to use numerous passes through the coating solution to obtain the desired thickness.

The second step of the manufacturing process consists of using a solution containing generally 10 to 15% by weight of polyamide-acid for preparing a polymer film by progressive evaporation of the solvent. The conversion of the polyamide-acid to a polyimide film is obtained by thermal or chemical dehydration.

This general technique for manufacturing polyimides is disclosed in particular in the French Pat. Nos. 1,239,491 and 1,256,203. In the second of said patents an example describes the use of polyimides as enamelling varnishes for electric wires. According to said example, pyromellitic dianhydride is reacted with bis-(p-amino-phenyl)ether dissolved in dimethylacetamide, to prepare a polyamide-acid having an inherent viscosity of 1.1 dl/g. For being usable on a coating machine, the polymer concentration is reduced to 11% (by weight) and ten successive posses through the enamelling solution are necessary to obtain an increase of the wire diameter of less than 50 microns.

Another method known for preparing aromatic polyimides consists of replacing the dianhydrides of tetracarboxylic acids by the products of their reaction with primary aliphatic alcohols, i.e. by the corresponding alkyl diesters or tetraesters. This polycondensation technique is disclosed in the French Pat. No. 1,360,488. and by V. L. Bell (Polymer Letters, 1967, 5, 941–946) for alkyl diesters of pyromellitic acid and 3,3',4,4'-benzophenone tetracarboxylic acid and various aromatic diamines. The monomers mixture is converted to polyimides by progressive heating up to 275° or 300° C. Since, after solvent evaporation, the polycondensation takes place in solid phase, this method is mainly used to prepare adhesives, composite materials or impregnation varnishes, since the polyimides obtained have generally a rather low molecular weight and a low flexibility or no flexibility at all.

With alkyl diesters of the above-mentioned acids, it is not possible to achieve a polycondensation in solution, since the polyimides are obtained as oligomers of low molecular weight and are infusible and insoluble in the polymerisation solvents, as shown in the comparative examples of the French Pat. No. 2,514,772.

The advantages and disadvantages of the two techniques for preparing polyimides according to the prior art may be summarized as follows:
the technique using dianhydrides is adapted for obtaining high molecular weights but the solution concentration is low, this being a disadvantage for applications as films or as protective layers,
the technique using diesters or tetraesters leads very quickly to insoluble products and it is impossible, according to the prior art, to obtain products of high molecular weight in solution.

SUMMARY OF THE INVENTION

It has now been discovered and is one of the objects of the invention, that certain compositions of dianhydride reactants and diester-diacid or tetraacid reactants can be used to prepare, by reaction in substantially stoichiometrical proportions with biprimary diamines, modified polyamide-acids which behave as precursors of polyimides with delay effect, having strongly improved properties as compared with the products of the prior art.

These compositions have a higher dry material content, a lower dynamic viscosity, the latent reactant of diester-diacid or tetraacid type acting as a temporary chain limiter. After thermal treatment, these compositions give polyimide coatings of excellent flexibility, of thermoplasticity temperatures generally higher than 600° C. and of a very good thermal stability, which is the better as the proportions of reactants are closer to the stoichiometric values.

The manufacture of polyimide precursor compositions according to the invention uses the following reactants:

at least one dianhydride of tetracarboxylic aromatic acid of general formula

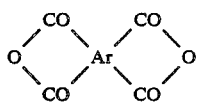 (1)

at least one biprimary aromatic diamine of general formula:

$NH_2—Ar'—NH_2$ (2)

and at least one aromatic compound of the general formula:

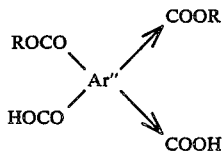 (3)

In these formulas, Ar and Ar" are carbocyclic or heterocyclic tetravalent aromatic radicals, whose four valencies are fixed on separate carbon atoms which are by pairs in ortho or peri position. Radicals Ar and Ar" may be formed of one or more rings, which then are coupled or linked together, each ring being preferably formed of 5 to 7 atoms, a part of which may consist of oxygen, sulfur and/or nitrogen atoms.

When radicals Ar and Ar" comprise several rings connected together, the linking elements are for example a single bond or one of the following atoms or groups:

—O—; —S—; —SO—; —SO$_2$—; —CO—; —CHOH—; —CH$_2$—; —CF$_2$—; —C(CH$_3$)$_2$—; —C(CF$_3$)$_2$—; —COO—; —CONH—; —CO—O—(CH$_2$)$_x$—O—CO—; —Si(CH$_3$)$_2$—; —O—Si(CH$_3$)$_2$—O—.

Ar' is a carbocyclic or heterocyclic divalent aromatic radical, the two valencies of which are on separate carbon atoms, not in ortho or peri position with respect to each other. Radical Ar' may be formed of one or more rings coupled or linked together as above defined for radicals Ar and Ar".

R is a hydrogen atom or a hydrocarbon monovalent radical, preferably containing 1 to 13 carbon atoms. In other terms, the compound of formula (3) may be a tetracarboxylic aromatic acid, or a bis(ortho-acid-ester) derived from a tetracarboxylic aromatic acid. In the latter case, the methyl diester is preferred.

The arrows indicate the isomerism possibilities when radical R is different from the hydrogen atom.

The polyimide precursor compositions of the invention, obtained from the chemical compounds of general formulas (1), (2) and (3), as above indicated, may be represented by the general formula:

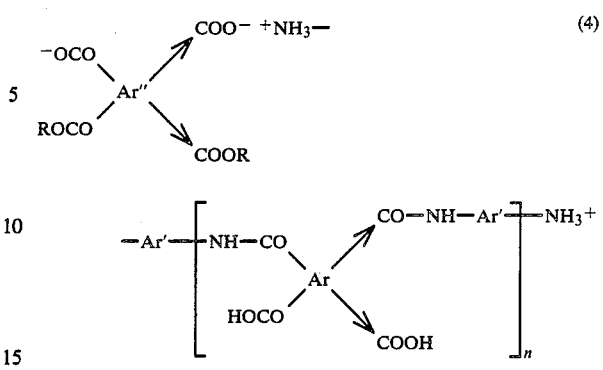

wherein Ar, Ar', Ar", R and the arrows have the same meaning as above stated.

In this formula, n is a number which represents the polymization degree and may take any value from 1 to 2 000. The number n cannot be directly determined but its average value is deduced from the molar proportions of the reactants used to prepare the considered compositions. Preferably, n has a value from about 5 to 100.

Examples of tetracarboxylic compounds of formula (1) which are convenient for manufacturing polyimide precursors according to the invention are dianhydrides of the following aromatic acids: (1,2,3,4) and (1,2,4,5)-tetracarboxy benzenes, 3-phenyl and 3,6-diphenyl pyromellitic acids, (1,2,5,6), (2,3,6,7), (1,2,4,5) and (1,4,5,8)-tetracarboxy naphthalenes, (2,2',3,3') and (3,3',4,4')-tetracarboxy biphenyls, (3,4,9,10)-tetracarboxy perylene, 2,2-bis(3,4-dicarboxy phenyl)propane, bis(3,4-dicarboxy phenyl)methane, bis(3,4-dicarboxy phenyl)ether, bis(3,4-dicarboxy phenyl)sulfide, bis(3,4-dicarboxy phenyl)sulfone, (2,2',3,3') and (3,3',4,4')-tetracarboxy benzophenones, (3,3',4,4')-tetracarboxy benzhydrol, (1,8,9,10)-tetracarboxy phenanthrene, (2,3,5,6)-tetracarboxy pyrazine, (2,3,4,5)-tetracarboxy thiophene, (2,2)-bis(3,4-dicarboxy phenyl)hexafluoropropane, (1,3)- and (1,4)-bis(3,4-dicarboxy benzoyl)benzenes, (4,4')-bis(3,4-dicarboxy benzoyl)diphenylether, (1,3) and (1,4)-bis(3,4-dicarboxy phenyl hydroxymethylene)benzenes, bis(3,4-dicarboxy phenyl)dimethylsilane, (3,3',4,4')-tetracarboxy benzanilide, bis(3,4-dicarboxy phenyl)difluoromethane (1,3) and (1,4)-bis(3,4-dicarboxy phenoxy benzenes).

Examples of compounds of formula (3) are the tetraacids themselves and the alkyl bis(ortho-acid-esters) prepared by reacting anhydrides with aliphatic alcohols, such for example as: methyl, ethyl, isopropyl, n-butyl, tert-butyl, neopentyl, octyl and dodecyl-esters.

Examples of primary aromatic diamines of formula (2) which are convenient for manufacturing the polyimide precursors according to the invention are: (1,3) and (1,4)-diamino benzenes, (2,4), (2,6) and (3,5)-diamino toluenes, diaminoxylenes, (3,3') and (4,4')-diamino diphenylmethanes, bis(4-amino-3-methyl phenyl)methane, (2,2)-bis(4-amino phenyl)propane, 4,4'-diamino biphenyl, 3,3'-dimethyl benzidine, 3,3'-dimethoxy benzidine, 3,3'-dichloro benzidine, (3,3') and (4,4')-diamino diphenylethers, (3,3') and (4,4')-diamino benzophenones, (3,3') and (4,4')-diamino benzhydrols, bis(4-amino phenyl)sulfide, bis(4-amino phenyl)sulfone, bis(3-amino phenyl)sulfone, (3,3'), (3,4'), (3',4) and (4,4')-diamino benzanilides, bis(4-amino phenyl)difluoromethane, (3,3'), (3,4'), (3',4) and (4,4')-diamino phenyl benzoates, bis(3 and 4-amino phenyl)dimethylsilanes, 2,2-bis(4-amino phenyl)hexafluoropropane, (1,3) and (1,4)-meta and para-aminophenoxy benzenes, (1,3) and (1,4)-meta and para-aminobenzoyl benzenes and (1,3) and (1,4)-meta and para-aminophenyl hydroxymethyl benzenes.

As shown in general formula (4), the compositions of the invention have a molecular structure formed of a telechelic α,ω-diamino polyamide-acids, whose ending amine groups are salified with the latent reactant of general formula (3). This reactant is practically inert at low temperature, the amine salt having a good stability up to about 100° C. On the contrary, at the time of use of the polyimide precursor compositions, the delayed reaction takes place between said compound and the ending amine groups of the polyamide-acid and the polycondensation continues with formation of imide rings when the temperature is higher than 120° C. and preferably from 160° to 400° C.

The resin compositions of the invention may be prepared by addition of the reactants, either simultaneously or separately to the reaction solvent. In a preferred embodiment, the resin compositions are prepared by dissolving, in a suitable solvent, first the latent reactant of formula (3), then the aromatic diamine so as to form the amine salts; the same result can be achieved by reversing the order of addition of the two reactants. The salification reaction results in a slight increase of the reaction medium temperature. At the end of said first operation, the dianhydride of formula (1) is added progressively, so as to avoid too high an increase in temperature. It is preferable to cool the reactor to maintain the temperature of the solution between 5° and 40° C., in order to avoid the uncontrolled formation of imide rings. After a few hours of stirring the solution concentration is optionally adjusted to the desired value by addition of a solvent identical or different from the initial solvent.

Examples of solvents which are convenient for the manufacture of the polyimide precursors according to the invention are: dimethylformamide, dimethylacetamide, diethylacetamide, dimethylsulfoxide, N-methylpyrrolidine-2-one, N-methylcaprolactam, dimethylsulfone, tetramethylurea, tetramethylenesulfone, N-acetylpyrrolidine 2-one, butyrolactone, hexamethylphosphoramide and many aprotic polar solvents.

It is possible to use these solvents separately or in combination, but it is also possible to use them in combination with other organic solvents which generally are not solvents for the polyamide-acids, such for example as benzene, toluene xylenes, naphtha solvents, chlorobenzene, ethyleneglycol and di- and triethyleneglycol ethers and esters, dioxane, tetrahydrofuran, cyclohexane, etc . . . .

It has been indicated above that the reaction of formation of the polyimide precursor compositions requires the use of reactant amounts very close to the theoretical stoichiometric amount in the reaction. However, since two kinds of reactants of acid type are reacted with an aromatic diamine with two different reaction modes, it is necessary to define what is meant by stoichiometrical amounts.

The total stoichiometry of the reaction consists of using a number of primary amine groups substantially equal to the number of ortho-difunctional acid reacting centers, originating either from the latent reactant of formula (3) or from the dianhydride of the formula (1). More precisely, a total amount of 0.9 to 1.1 primary amine groups is used preferably for one ortho-difunctional reacting center originating from any one of the preceding reactants. The best results are obtained with an amount from 0.98 to 1.02 primary amine groups.

The respective proportions of compounds of formulae (1) and (3) introduced in the compositions of the invention are, to a large extent, determined by the nature of the contemplated application. These proportions have an important effect on the molecular weight of the intermediary telechelic α,ω-diamino polyamide-acids, and, consequently, on all the viscosimetry properties of the solution. Generally, the compound of formula (3) may be used in an amount from 0.05 to 50 moles per 100 moles of all the compounds of formulas (1) and (3).

Depending on the expected application, for 100 moles of ortho-difunctional acid reacting centers, there can be used for example from 1 to 15 moles of latent reactant of formula (3) and corresponding 99 to 85 moles of dianhydride (1) which will be reacted, as above-stated, with 90 to 110 and preferably 98 to 102 moles of primary aromatic diamine.

When the latent reactant of formula (3) is used in a relatively high proportion, for example 10 to 15% by mole, the inherent viscosity of the polymer is about 0.35 to 0.55 dl/g and, for a dry material concentration of 25-30% by weight, the solution has a dynamic viscosity of about 5,000-7,000 mPa.s at 25° C. This kind of composition is particularly well adapted to such applications as impregnation varnishes or adhesive layers.

For manufacturing insulating coatings on metal surfaces, compositions are prepared which contain at most 10% and preferably 4 to 10% by mole of latent reactant (3) and at least 90%, preferably 96 to 90% of dianhydride (1). Finally, for enamelling electric wires or magnetic wires, the compositions are prepared with preferably 2-7% by mole of latent reactant (3) and 98-93% of dianhydride (1). The inherent viscosity of the polymers is then from 0.5 to 1.2 dl/g and, depending on the concentration of dry material, which may vary from 15 to 25%, the obtained solutions have a dynamic viscosity ranging from 2 000 to 10 000 mPa.s.

The polyimide precursor compositions have been defined as carboxylic salts of polyamide-acids prepared from at least three compounds of general formulas (1), (2) and (3). Any compositions prepared with 2 or more different latent agents (3), biprimary diamines (2) or dianhydrides (1) are also within the scope of the invention. It may be useful to use several diamines or several dianhydrides to prepare statistical or pseudo-sequenced copolymers, so as to modify the rheological, mechanical or thermal properties of the products or even decrease their manufacturing cost.

The present invention also concerns the use of resin compositions, such as above-described, for making insulating coatings, films, impregnation or enamelling varnishes, having very good properties of flexibility, adhesiveness to substrates, resistance to heat and to thermal shock. These materials are manufactured by conventional coating techniques from solutions whose viscosity has been adjusted for adaptation to the considered system. After evaporation of the one or more solvents, the polycondensation reactions of the reactants with delay effect and the formation of imide rings are achieved by heating at a temperature higher than 100° C. and preferably from 120° to 400° C.

EXAMPLES

The invention will be described more in detail with reference to the following specific examples, which are given by way of illustration and not limitation. In these examples, the reactions of polymers formation are conducted under stirring and in inert atmosphere to avoid oxidation of aromatic amines. Example 1, given by way of comparison, uses the technique known for preparing varnishes of polyamide-acid.

In all the examples, the abbreviations C, IV and DV, respectively represent the concentration of dry material in % by weight, the inherent viscosity in dl/g and the dynamic viscosity in mPa.s.

The inherent viscosities are measured at 30° C. for a concentration of 5 g of resin in one liter of N-methyl pyrrolidine 2-one (NMP).

The dynamic viscosities of the solutions are measured at 25° C. with a viscosimeter with cone/plane system of the HAAKE-ROTOVISCO type.

For simplifying the writing of the names of chemical products, mixtures of isomer compounds are designated by a term in the singular as, for example, methyl diester of pyromellitic acid.

The names of the chemical products used in these examples are designed by the following abbreviations:
  for solvents: NMP: N-methylpyrrolidinone, DMAC: dimethylacetamide;
  for diamines: BZ: benzidine; DMMDA; bis(4-amino-3-methyl phenyl)methane; MDA: bis(4-amino phenyl)methane; MPDA: metaphenylenediamine, ODA: bis(4-amino phenyl)ether; PPDA: paraphenylenediamine;
  for dianhydrides of tetracarboxylic acids: BPTDA: 3,3',4,4'-biphenyl; BTDA: 3,3',4,4'-benzophenone; DPEDA: 3,3',4,4'-diphenylether; HFTDA: 2,2-bis(3,4-phenyl)hexafluoropropylidene; PMDA: 1,2,4,5-benzene, finally;
  for methyl diesters of tetracarboxylic acids: BHTDE: 3,3',4,4'-benzhydrol; BTDE: 3,3',4,4'-benzophenone; PMDE: pyromettitic.

EXAMPLE 1
(comparative)

8.725 g (0.04 mole) of PMDA are progressively added to a solution of 8.009 g (0.04 mole) of bis(4-amino phenyl)ether (ODA) in 94.83 g of NMP. After 15 hours of reaction at 20° C., the polyamide-acid solution has the following characteristics: C=15%, IV=2.45, DV=240,000.

This solution is much too viscous for being used as such. By solvent addition, its concentration is reduced to 9.5% so as to obtain a dynamic viscosity of 7 200.

When used for enamelling copper wire, the so-prepared varnish solution requires 12 passes for obtaining a diameter increase of about 50 microns.

EXAMPLE 2

In a reactor containing 530 g of NMP are added 7.184 g (18.5 $10^{-3}$ mole) of BHTDE and then, after dissolution, 74.09 g (370 $10^{-3}$ mole) of ODA.

Then 76.671 g (351.5 $10^{-3}$ mole) of PMDA are progressively added by means of an endless-screw introducer, while maintaining the temperature between 15° and 20° C. After 15 hours of reaction, the solution, diluted with a little solvent, has the following properties: C=22.5%, IV=0.58, DV=4 800. Calculated value of polymerization degree n=19.

EXAMPLES 3 TO 8

With the reactants used in example 2, a series of compositions is prepared by varying the respective proportions of the constituents as indicated in table 1 hereinafter. This table gives the values of C, IV, DV and the calculated value of n.

TABLE 1

| Example no | BHTDE g | BHTDE $10^{-3}$ mole | ODA g | ODA $10^{-3}$ mole | PMDA g | PMDA $10^{-3}$ mole | C % by weight | IV dl/g | DV mPa.s. | n |
|---|---|---|---|---|---|---|---|---|---|---|
| 3 | 6.854 | 17.6 | 50.06 | 250 | 52.89 | 242.5 | 17.1 | 0.88 | 6200 | 13.8 |
| 4 | 35.91 | 92.5 | 460.46 | 2299.5 | 481.62 | 2208 | 21 | 0.63 | 5000 | 23.9 |
| 5 | 35.91 | 92.5 | 460.46 | 2299.5 | 481.62 | 2208 | 20.4 | 0.63 | 3400 | 23.9 |
| 6 | 3.106 | 8.0 | 32.039 | 160 | 33.155 | 152 | 20 | 0.57 | 3600 | 19 |
| 7 | 6.213 | 16.0 | 32.039 | 160 | 31.41 | 144 | 25 | 0.48 | 5000 | 9 |
| 8 | 9.32 | 24.0 | 32.039 | 160 | 29.665 | 136 | 27 | 0.42 | 68000 | 5.7 |

EXAMPLE 9

A composition is prepared in the conditions of example 2 by reacting successively 2.26 g (8.$10^{-3}$ mole) of PMDE, 32.04 g (160.$10^{-3}$ mole) of ODA and 33.16 g (152.$10^{-3}$ mole) of PMDA. After 20 hours of reaction, the obtained values are C=20%, IV=0.62 and DV=3500. Calculed value of n=19.

EXAMPLE 10

In 580 g of DMAC, 5.503 g (14.$10^{-3}$ mole) of BHTDE are reacted with 77.325 g (390.$10^{-3}$ mole) of MDA and 80.816 g (370.5.$10^{-3}$ mole) of PMDA. The formed composition has the following characteristics: C=22.1%, IV=0.76 and DV=3030. Calculed value of n=26.5.

EXAMPLES 11 TO 14

1.411 g (5.$10^{-3}$ mole) of PMDE are reacted, in the conditions of example 2, with the diamine amount indicated in table 2 (corresponding to 0.100 mole) and then 20.72 g (95.$10^{-3}$ mole) of PMDA are added progressively. The properties of these compositions are indicated in table 2. The calculated value of n is always 19.

TABLE 2

| Example no | Diamine | Weight (g) | C (% by weight) | IV (dl/g) | DV (mPa.s.) |
|---|---|---|---|---|---|
| 11 | MPDA | 10.815 | 22 | 0.65 | 3150 |
| 12 | PPDA | 10.815 | 21.8 | 0.71 | 4120 |
| 13 | DMMDA | 22.633 | 23.1 | 0.74 | 3610 |
| 14 | BZ | 18.424 | 20.9 | 0.68 | 3820 |

EXAMPLES 15 TO 18

In the same conditions, 1.9417 g (5.$10^{-3}$ mole) of BHTDE and 20.024 g (0.100 mole) of ODA are reacted with the dianhydride amount indicated in table 3 (corresponding to 95.10$^{-3}$ mole), to prepare a series of compositions having the properties indicated in said table. The calculated value of n is always 19.

TABLE 3

| Example no | Dianhydride | Weight (g) | C (% by weight) | IV (dl/g) | DV (mPa.s.) |
|---|---|---|---|---|---|
| 15 | BTDA | 30.612 | 20 | 0.68 | 4030 |
| 16 | BPTDA | 27.951 | 19.5 | 0.72 | 5025 |
| 17 | DPEDA | 29.471 | 21.9 | 0.69 | 3080 |
| 18 | HFTDA | 42.204 | 22.1 | 0.66 | 3110 |

EXAMPLE 19

252.8 g of NMP and 63 g of DMAC, forming a solvent mixture, are introduced into a reactor wherein are added successively 19.827 g (0.100 mole) of MDA and 20.024 g (0.100 mole) of ODA and then after dissolution, 2.704 g (7.10$^{-3}$ mole) of BTDE. Then 21.813 g (0.100 mole) of PMDA and 29.968 g (93.10$^{-3}$ mole) of BTDA are progressively added. After 24 hours of reaction at room temperature, the composition has the following values: C=23%, IV=0.565, DV=6240; calculated value of n=27.6.

EXAMPLES 20 TO 30

Certain of the compositions of the preceding examples are spread on a copper sheet of 0.2 mm thickness by using an applicator, so as to obtain, after solvent evaporation, an enamel layer of 0.025 mm thickness and 2 cm width. The behaviour of the varnish is evaluated after treatment for one hour at 150° C., one hour at 200° C., one hour at 250° C. and one hour at 300° C. The adhesiveness and the flexibility are determined, on the one hand, by subjecting the metal sheet to a traction stress, up to metal breaking and, on the other hand, by folding the sheet at 90° and then at 180°. If the varnish withstands, without cracks or loss of adhesiveness, a folding at 90°, it may be considered as good (G) and, at 180°, as very good (VG). If only scarce cracks appear, it is considered as passably good (PG), in the other cases as bad (B).

TABLE 4

| Example no | Composition of example no | Adhesiveness | Flexibility |
|---|---|---|---|
| 20 | 2 | VG | VG |
| 21 | 3 | VG | VG |
| 22 | 4 | VG | VG |
| 23 | 5 | VG | VG |
| 24 | 7 | G | G |
| 25 | 8 | PG | B |
| 26 | 9 | VG | VG |
| 27 | 10 | G | G |
| 28 | 14 | VG | VG |
| 29 | 15 | VG | VG |
| 30 | 19 | VG | VG |

EXAMPLES 31 TO 45

Some of the compositions of the preceding examples are used to enamel copper wire of 1 mm diameter by 8 passages at a rate of 9 meters/minute, so as to obtain, after passage in the furnace, an oversize of 0.070 mm. The thermoplasticity of the enamel layer is then measured according to the French Standard NF-C31-462. The flexibility is measured by lenghtening the enamelled wire by 0 to 30% of its initial length and then by winding it round its own diameter. If no crack occurs it is considered as good for the considered lengthening. The results are summarized in table 5.

TABLE 5

| Example no | Composition of example no | Thermoplasticity Temperature (°C.) | Enamel flexibility | |
|---|---|---|---|---|
| 31 | 2 | >600 | VG | 25% |
| 32 | 3 | >600 | VG | 25% |
| 33 | 4 | >600 | VG | 20% |
| 34 | 6 | >600 | VG | 20% |
| 35 | 7 | >600 | G | 10% |
| 36 | 9 | >600 | VG | 25% |
| 37 | 10 | 580 | G | 15% |
| 38 | 11 | 600 | VG | 20% |
| 39 | 12 | >600 | VG | 15% |
| 40 | 14 | >600 | VG | 15% |
| 41 | 15 | 540 | VG | 25% |
| 42 | 16 | >600 | VG | 25% |
| 43 | 17 | 470 | VG | 25% |
| 44 | 18 | 380 | VG | 25% |
| 45 | 20 | 600 | VG | 25% |

What is claimed as the invention is:

1. A process for preparing a polyimide precursor composition comprising:
   (a) a first step of reacting, within a solvent, at least one biprimary aromatic diamine of general formula (2):

NH$_2$—Ar'—NH$_2$       (2)

with at least one tetracarboxylic aromatic compound of general formula (3):

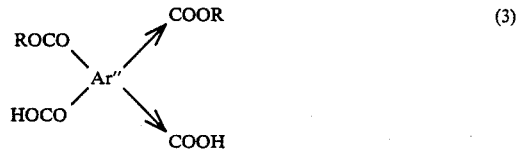

and,
   (b) a second step of reacting the product obtained in step (a) with at least one dianhydride of a tetracarboxylic aromatic acid of general formula (1):

wherein Ar' is a divalent aromatic radical formed of one or more rings, the two valencies Ar' are on separate carbon atoms, not in ortho or peri position; Ar and Ar" are tetravalent aromatic radicals formed of one or more rings, the four valencies of which are on separate carbon atoms placed by pairs in ortho or peri position; R is a hydrogen atom or a monovalent hydrocarbon radical, and the arrows indicate the isomerism possibilities, the reactants proportions being from 0.05 to 50 moles of compound of formula (3) and 90 to 110 moles of compound of formula (2) per 100 moles of all the compounds of formulas (1) and (3).

2. A process according to claim 1, wherein R is a hydrogen atom.

3. A process according to claim 1, wherein R is a hydrocarbon radical of 1 to 13 carbon atoms.

4. A process according to claim 3, wherein R is a methyl radical.

5. A process according to claim 1, wherein, the the operating temperature is maintained between 5° and 40° C.

6. A process according to claim 1, wherein 1 to 15 moles of compound of formula (3) are used for 100 moles of all the compounds of formulas (1) and (3).

7. A process for manufacturing a polyimide, comprising heating a composition according to claim 1 at a temperature higher than 120° C.

8. A process according to claim 7, characterized in that the heating temperature is from 160° to 400° C.

9. A process for manufacturing a a coated substrate, comprising coating said substrate with a solution of a composition of claim 1, evaporating the solvent and heating at a temperature of at least 120° C.

10. A method according to claim 9, wherein 10-15 mole % of a compound of formula (3) is used in the products of the precursor composition resulting in a substrate having a varnish or adhesive layer.

11. A method according to claim 9, wherein 4-10 mole % of a compound of formula (3) and 96-90% of a compound of formula (1) are used in the production of the precursor composition, and the substrate is metal, resulting in an insulated metal surface.

12. A method according to claim 9, for enamelling electric or magnetic wires, wherein 2-7 mole % of a compound of formula (3) and 98-93% of a compound of formula (1) are used in the production of the precursor composition.

13. An alpha, omega-diamino polyamide-acid of the formula 4:

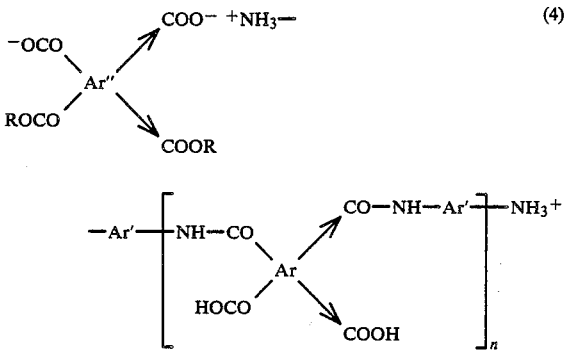

wherein Ar' is a divalent aromatic radical formed of one or more rings, the two valencies of Ar' are on separate carbon atoms, not in ortho or peri position; Ar and Ar" are tetravalent aromatic radicals formed of one or more rings, the four valencies of which are on separate carbon atoms placed by pairs in ortho or peri position; R is a hydrogen atom or a monovalent hydrocarbon radical, and the arrows indicate the isomerism possibilities, and n is 1–2,000.

14. A process according to claim 13, wherein R is hydrogen atom.

15. A process according to claim 13, wherein R is a hydrocarbon radical of 1 to 13 carbon atoms.

16. A process according to claim 13, wherein R is a methyl radical.

17. An alpha, omega-diamino polyamide-acid according to claim 13, wherein n is about 5-100.

18. A process for the preparation of a polyimide precursor comprising: reacting simultaneously in a solvent at least one biprimary aromatic amine of the formula 2:

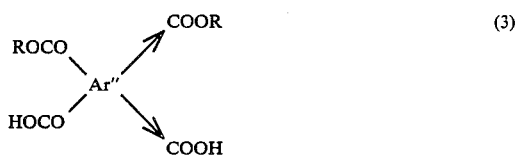

at least one tetracarboxylic aromatic compound of the formula 3:

and at least one dianhydride of a tetracarboxylic aromatic acid of the formula 1:

$$O \underset{CO}{\overset{CO}{\diagdown}} Ar \underset{CO}{\overset{CO}{\diagdown}} O \quad (1)$$

wherein Ar' is a divalent aromatic radical formed of one or more rings, the two valencies of Ar' are on separate carbon atoms, not in ortho or peri position; Ar and Ar" are tetravalent aromatic radicals formed of one or more rings, the four valencies of which are on separate carbon atoms placed by pairs in ortho or peri position; R is a hydrogen atom or a monovalent hydrocarbon radical, and the arrows indicate the isomerism possibilities, the reactants proportions being from 0.05 to 50 moles of compound of formula (3) and 90 to 110 moles of compound of formula (2) per 100 moles of all the compounds of formulas (1) and (3).

19. A process according to claim 18, wherein the amine of formula 2 is (1,3) or (1,4)-diamine benzene; (2,4)diamino, (2,6)diamino or (3,5)-diamino toluene; diaminoxylene; (3,3')diamino or (4,4')-diamino diphenylmethane; bis(4-amino 3-methyl phenyl)methane; 2,2-bis(4-amino phenyl)propane; 4,4'-diamino biphenyl; 3,3'-dimethyl benzidine; 3,3'-dimethoxy benzidine; 3,3'-dichloro benzidine; (3,3') or (4,4)-diamno diphenylether; (3,3') or (4,4')-diamino benzophenone, (3,3') or (4,4')diamino benzhydrol; bis(4-amino phenyl)sulfide; bis(4-amino phenyl)sulfone; bis(3-amino phenyl)sulfone; (3,3') (3'4) (3,4') or (4,4)diamino benzanilidine; bis(4-amino phenyl)difluoromethane; (3,3') (3,4') (3'4) or (4,4')-diamino phenyl benzoate; bis(3-amino phenyl)-dimethylsilane; bis(4-amino-phenyl)dimethylsilane; 2,2-bis(4-amino phenyl)hexafluoropropane; (1,3) or (1,4)-meta or para aminophenoxy benzene; (1,3) or (1,4)-meta or para aminobenzoyl benzene; or (1,3) or 1,4 (1,4)-meta or para aminophenyl hydroxymethyl benzene.

20. A process according to claim 18, wherein the tetracarboxylic compound of formula (3) is tetracid.

21. A process according to claim 18, wherein the tetracarboxylic compound of formula (3) is an alkyl bis(ortho-acid-ester) obtained by reacting an anhydride with an aliphatic alcohol.

22. A process according to claim 21, wherein the bis(ortho-acid-ester) is a methyl, ethyl, isopropyl, n-butyl, tert-butyl, neopentyl, octyl or dodecyl ester.

23. A process according to claim 18, wherein the dianhydride of formula (1) is a dianhydride of:
(a) (1,2,3,4)- or (1,2,4,5)-tetracarboxy benzene,
(b) 3-phenyl or 3,6-diphenyl pyromellitic acid
(c) (1,2,5,6)-, (2,3,6,7)-, (1,2,4,5)- or (1,4,5,8)-tetracarboxy naphthalene,
(d) (2,2',3,3')- or (3,3',4,4')-tetracarboxy diphenyl,
(e) (3,4,9,10)-tetracarboxy perylene, (f) (2,2')-bis(3,4-dicarboxy phenyl)propane,
(g) bis(3,4-dicarboxy phenyl)methane
(h) bis(3,4-dicarboxy phenyl)ether,
(i) bis(3,4-dicarboxy phenyl)sulfide,
(j) bis(3,4-dicarboxy phenyl)sulfone,
(k) (2,2',3,3')- or (3,3',4,4')-tetracarboxy benzophenone,
(l) (3,3',4'4')-tetracarboxy benzhydrol,
(m) (1,8,9,10)-tetracarboxy phenanthrene,
(n) (2,35,6)-tetracarboxy pyrazine,
(o) (2,3,4,5)-tetracarboxy thiophene,
(p) (2,2)-bis(3,4-dicarboxy phenyl)hexafluoropropane,
(q) (1,3)- or (1,4)-bis(3,4-dicarboxy benzoyl)benzene,
(r) (4,4)'-bis(3,4-dicarboxy benzoyl)diphenylether,
(s) (1,3)- or (1,4)-bis(3,4-dicarboxy phenyl hydroxymethylene)benzene,
(t) bis(3,4-dicarboxy phenyl)dimethylsilane,
(u) (3,3'4,4')-tetracarboxy benzanilide,
(v) bis(3,4-dicarboxy phenyl)difluoromethane, or
(w) (1,3)- or (1,4)-bis(3,4-dicarboxy phenoxy)benzene.

24. A polyamide precursor composition produced according to the process of claim 1.

25. A polyamide precursor composition produced according to the process of claim 2.

26. A polyamide precursor composition produced according to the process of claim 3.

27. A polyamide precursor composition produced according to the process of claim 4.

28. A polyamide precursor composition produced according to the process of claim 5.

29. A polyamide precursor commposition produced according to the process of claim 5.

* * * * *